US012065569B2

(12) United States Patent
Kephart

(10) Patent No.: US 12,065,569 B2
(45) Date of Patent: *Aug. 20, 2024

(54) FORMULATIONS AND PRODUCTS TO REPLACE SINGLE-USE PLASTICS AND POLYSTYRENE WITH BIO-BENIGN MATERIALS SUCH AS AGRICULTURAL WASTES

(71) Applicant: NUTJOBS, Carmel, CA (US)

(72) Inventor: Paul Ray Kephart, Carmel, CA (US)

(73) Assignee: NUTJOBS, Carmel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,165

(22) Filed: Feb. 27, 2023

(65) Prior Publication Data

US 2023/0203310 A1 Jun. 29, 2023

Related U.S. Application Data

(63) Continuation-in-part of application No. 17/876,647, filed on Jul. 29, 2022, now Pat. No. 11,591,474, which is a continuation-in-part of application No. 17/582,643, filed on Jan. 24, 2022, now Pat. No. 11,434,373, which is a continuation-in-part of application No. 17/360,278, filed on Jun. 28, 2021, (Continued)

(51) Int. Cl.
*C08L 97/00* (2006.01)
*C08J 3/00* (2006.01)

(52) U.S. Cl.
CPC .............. *C08L 97/00* (2013.01); *C08J 3/005* (2013.01); *C08J 2397/00* (2013.01); *C08J 2467/04* (2013.01); *C08J 2491/00* (2013.01); *C08J 2497/00* (2013.01); *C08L 2203/30* (2013.01); *C08L 2205/025* (2013.01); *C08L 2205/03* (2013.01); *C08L 2207/20* (2013.01); *C08L 2207/32* (2013.01)

(58) Field of Classification Search
CPC .............. C08L 97/00; C08L 2205/025; C08L 2207/32; C08J 3/005; C08J 2467/04
See application file for complete search history.

(56) References Cited

U.S. PATENT DOCUMENTS

| | | | |
|---|---|---|---|
| 3,983,842 | A | 10/1976 | Marion et al. |
| 2002/0064495 | A1 | 5/2002 | Miura et al. |

(Continued)

FOREIGN PATENT DOCUMENTS

| | | |
|---|---|---|
| CN | 108641256 | 5/2018 |
| EP | 0 533 314 A2 | 3/1993 |

(Continued)

OTHER PUBLICATIONS

Guru et al (Production of Polymer Matrix Composite Particleboard from Pistachio Shells and Improvement of its Fire Resistance by Fly Ash, High Temperature Material Processes, 28, 191-195 (2009). (Year: 2009).*

(Continued)

*Primary Examiner* — Doris L Lee
(74) *Attorney, Agent, or Firm* — POLSINELLI PC

(57) ABSTRACT

The present invention provides methods for preparing the nut waste composites from a nut waste component, one or more binders, and an oil using a compounder/extruder.

7 Claims, 6 Drawing Sheets

Related U.S. Application Data now Pat. No. 11,230,507, which is a continuation-in-part of application No. 17/074,034, filed on Oct. 19, 2020, now Pat. No. 11,046,836.

(60) Provisional application No. 62/923,044, filed on Oct. 18, 2019.

(56) References Cited

U.S. PATENT DOCUMENTS

| | | |
|---|---|---|
| 2015/0018183 A1 | 7/2015 | Hasumi |
| 2019/0021837 A1 | 7/2019 | MacEwan et al. |

FOREIGN PATENT DOCUMENTS

| | | |
|---|---|---|
| WO | 2014/120417 A2 | 8/2014 |
| WO | 2019/113520 A1 | 6/2019 |

OTHER PUBLICATIONS

AdvanTechPlastics, Almonds in Plastic Packaging? Are you Nuts? Aug. 24, 2018 (Year: 2018).*

International Search Report of International Application No. PCT/US20/56334, dated Dec. 7, 2020.

Torrefaction. BTG Biomass Technology Group BV, [retrieved on Dec. 4, 2020]. Retrieved from the Internet <URL: https://www.btgworld.com/en/rtd/technologies/torrefaction >.

Derwent of CN 108641256 (Year: 2018).

* cited by examiner

FORMULATIONS AND PRODUCTS TO REPLACE SINGLE-USE PLASTICS AND POLYSTYRENE WITH BIO-BENIGN MATERIALS SUCH AS AGRICULTURAL WASTES

CROSS REFERENCE TO RELATED APPLICATIONS

The present application is a continuation in part of U.S. application Ser. No. 17/876,647, filed on Jul. 29, 2022, which is a continuation in part of U.S. application Ser. No. 17/582,643, filed on Jan. 24, 2022, now U.S. Pat. No. 11,434,373, which is a continuation in part application of U.S. patent application Ser. No. 17/360,278, filed on Jun. 28, 2021, now U.S. Pat. No. 11,230,507, which is a continuation in part application of U.S. patent application Ser. No. 17/074,034, filed on Oct. 19, 2020, now U.S. Pat. No. 11,046,836, which claims the benefit of U.S. Provisional Application No. 62/923,044, filed on Oct. 18, 2019, entitled, "FORMULATIONS AND PRODUCTS TO REPLACE SINGLE-USE PLASTICS AND POLYSTYRENE WITH BIO-BENIGN MATERIALS SUCH AS AGRICULTURAL WASTES," the entire contents of which are entirely incorporated by reference herein.

FIELD OF THE INVENTION

The present disclosure generally relates to cured nut waste composites comprising a nut waste component, one or more binders, one or more fillers, and an oil which are extruded, molded, or thermoformed into a two-piece panel system, a rigid modular roofing or landscaping tray, and a structurally horticultural pot.

BACKGROUND OF THE INVENTION

Plastic products have been shown to not only pollute the environment through their production but also do not appreciably degrade. Products such as Styrofoam, plastic grocery bags, plastic bottles, and plastic six pack ring carriers for soda and beer cans and bottles have been documented which adversely affects wildlife, wildlife habitat, and human life. Plastic pollution can afflict land, waterways, and oceans. It is estimated that 1.1 to 8.8 million tons of plastic waste enters the ocean from coastal communities each year. Living organisms, particularly marine animals, can be harmed either by mechanical effects, such as entanglement in plastic objects, problems related to ingestion of plastic waste, or through exposure to chemicals within plastics that interfere with their physiology. Effects on humans include disruption of various hormonal mechanisms. As of 2018, about 380 million tons of plastics are produced worldwide each year. From the 1950s up to 2018, an estimated 6.3 billion tons of plastic have been produced worldwide, of which an estimated 9% has been recycled and another 12% has been incinerated. Even though plastics can be recycled, their rate of biodegradability is considered low.

Nut wastes, shells, hulls, and nut enclosures, from nuts are generally incinerated or discarded. This waste not only places a burden on the environment but also wastes a large amount of useable resources. This waste is considered a biomass and can be used in products which environmentally friendly and reduce the pollution in the environment.

As an example, California produces an estimated 80% of the world's almond nuts. During the 2013-2014 crop year, nut growers produced approximately 7 billion pounds of almond nut almond fruit (drupe) resulting in 2 billion pounds of almond nuts, 4 billion pounds of almond hulls, and 1 billion pounds of almond shells. Most of these almond nut shells and almond hulls were sold as cattle feed and used as fuel for boilers and power generation. However, a sizable fraction of these almond shells and almond hulls were sent to landfills. Thus, an important resource in the almond nut almond shells and hulls were wasted.

Other culinary nuts and non-culinary nuts face the same fate as the almonds. The drupes or fruit are removed, leaving the hull, shell, nut enclosure, or a combination of these as a waste.

Customers of these plastic products have requested new, ecofriendly products. These products would not leave a lasting footprint on the environment. Some of these products, such as cups, are now made solely of paper.

What is needed is an environmentally friendly product which can be used to replace plastic products and have increased biodegradability.

FIGURES

FIG. 1, FIG. 2, FIG. 3, and FIG. 4 are graphical representations of various pots produced using the nut waste composite.

SUMMARY OF THE INVENTION

Figure 1:
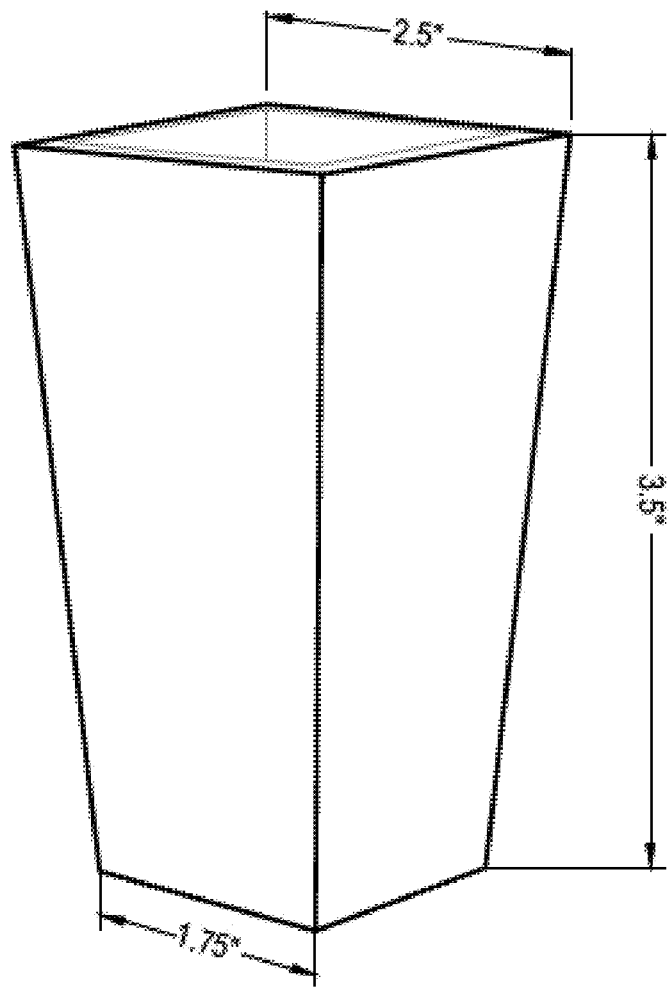
Figure 2:
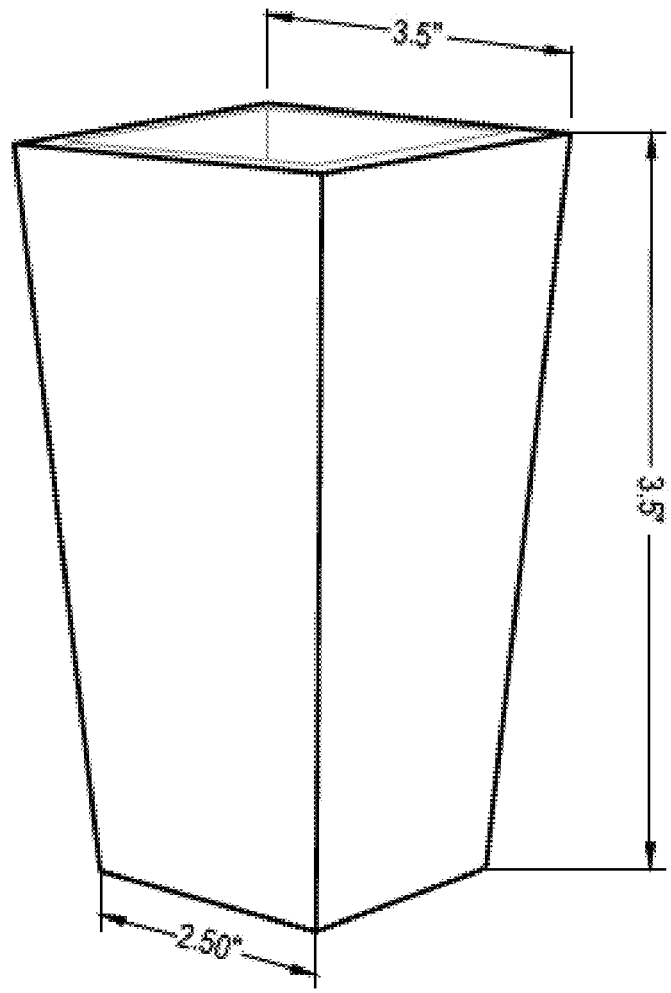
Figure 3:
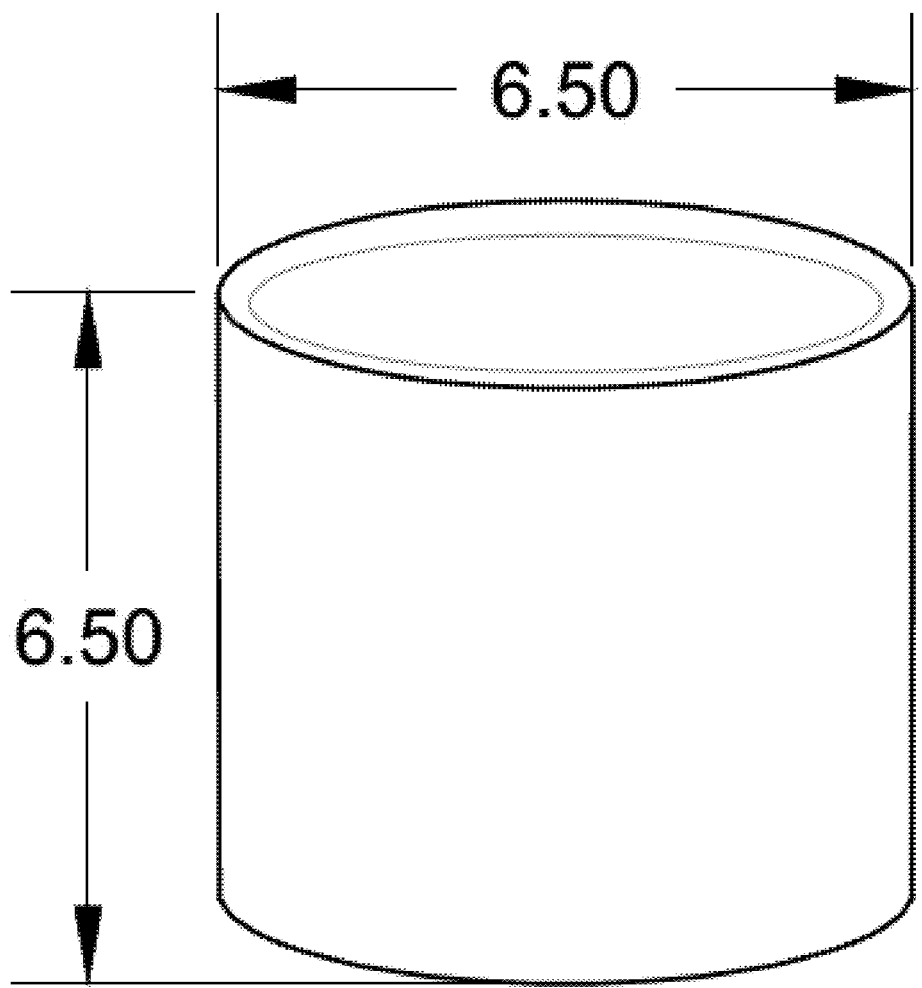
Figure 4:
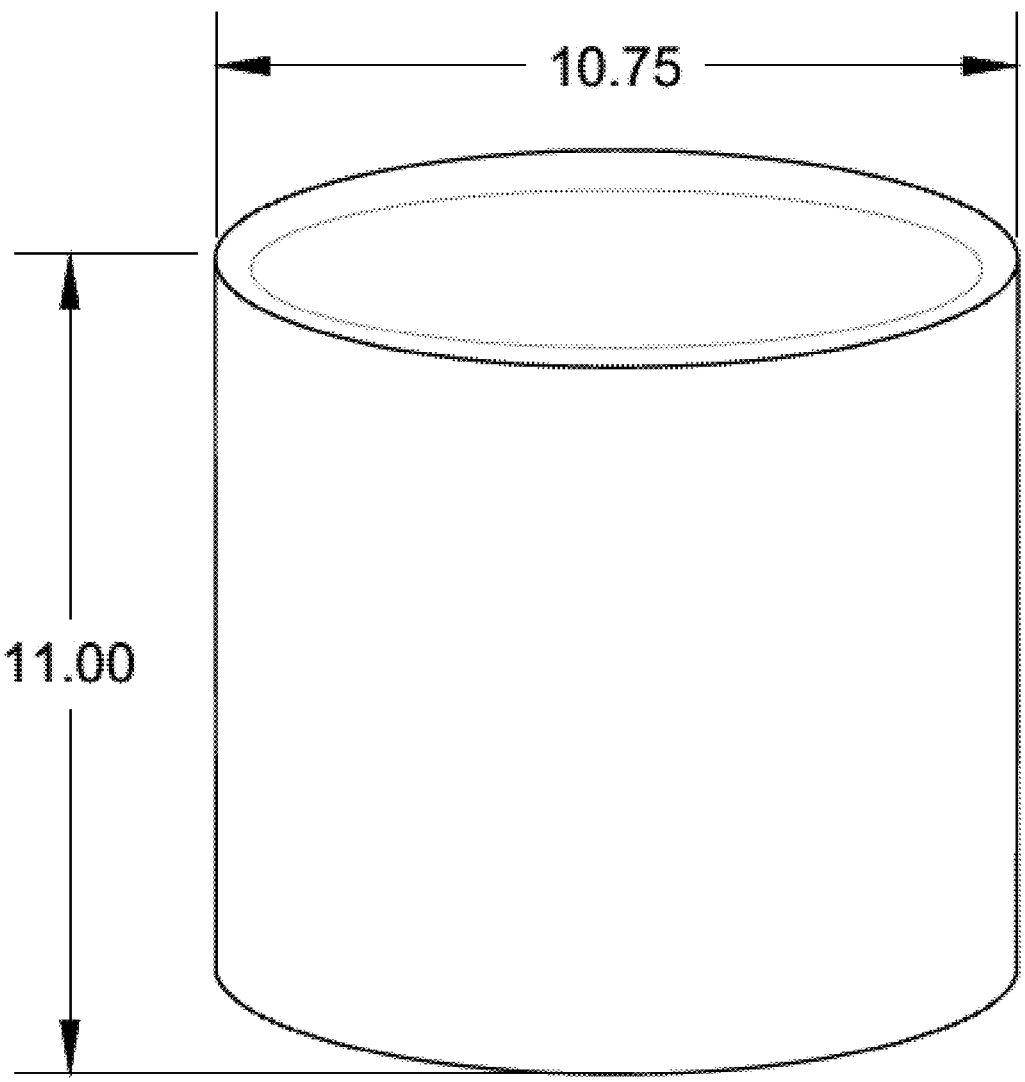

In one aspect, as disclosed herein, A cured nut waste pot composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 µm or less than 500 µm and greater than 250 µm; (e) compounding the nut waste component from step (d), one or more binders selected from a group consisting of polyhydroxybutyrate (PHB), polyhydroxyalkanoate (PHA), polylactic acid (PLA), guayule, natural latex, bentonite, an anionic starch, hyaluronic acid, triethylcitrate, and any combinations thereof; one or more fillers; and an oil producing a compounded mixture; (f) heating the compounded mixture to a temperature from about 110° C. to about 200° C. for less than about 5 minutes; (g) extruding, molding, or thermoforming the compounded mixture from step (f) into a form; and (h) cooling the form to form the cured nut waste pot composite; wherein the mixture in step (e) consists of about 35.0 weight % (wt. %) to about 75.0 wt. % of the nut waste component, about 25.0 wt. % to about 40.0 wt. % of one or more binders, about 0.0 wt. % to about 25.0 wt. % of one or more fillers; about 0.0 wt. % to about 20.0 wt. % of an oil.

Other features and iterations of the invention are described in more detail below.

DETAILED DESCRIPTION OF THE INVENTION

Provided herein are composites of cured nut waste, methods for preparing these cured nut waste composites using a compounder/extruder, and methods for utilizing these nut waste composites. Advantageously, these cured nut waste composites are low cost, environmentally friendly, biodegradable, easily manufactured, and can be formed into various shapes and sizes.

(I) Cured Nut Waste Composites

The present disclosure encompasses cured nut waste composites comprising a nut waste component, one or more binders, one or more fillers, and an oil. The cured nut waste composite may optionally comprise at least one fungus, at least one bacterium, or a combination of at least one fungus and at least one bacterium. After forming the cured nut waste composites, the cured nut waste composites are extruded, molded, or thermoformed into various forms. These forms are considered durable, permeable, biodegradable, and biocompostable.

(a) Nut Waste Component in Composite

The nut waste component is a by-product of removing the nut hull and nut shell from the fruit of the nut, also known as the drupe. Generally, the nut hull and nut shell are disposed of and not utilized in any significant amount in a commercial product. Generally, the nut waste component includes a nut shell, a nut hull, or a combination of a nut shell and a nut hull. In various embodiments, the nut waste component including nut shells, a nut hulls, or a combination of nut shells and nut hulls may be pre-processed before introduction into the nut waste composite.

A variety of nut shells and nut hulls may be used in the nut waste component. Generally, these nut shells and nut hulls may be derived from a variety of nuts. Non-limiting examples of these nuts may be an acorn, American beech, almond, breadfruit, candlenut, chestnuts, peanuts, hazelnuts, kola nuts, palm nuts, red bopple nuts, cashews, coconuts, hickory, pecans, Jack nuts, pistachio, walnuts, pine nuts, ginko nuts, Brazil nuts, macadamia, and paradise nut. In one embodiment, the nut may be an almond.

As appreciated by the skilled artisan, the nut waste component comprises various mixtures of cellulose, hem icellulose, and lignin. The mixtures of cellulose, hem icellulose, and lignin provide hydroxyl and phenolic functionalities on the cellulose, hem icellulose, and lignin that cross-link with themselves and/or one or more binders. This cross-linking produces a nut waste pot composite that provides increased strength, flexibility, and durability.

In various embodiments, the nut waste component including nut shells, a nut hulls, or a combination of nut shells and nut hulls may utilize a pre-processing step before introduction into the pot composite. This pre-processing step dries the nut waste component, adjusts the pH of the nut waste component and then dries the nut waste component, adjusts the pH of the nut waste component and then sterilizes the nut waste component, or adjusts the pH of the nut waste component and then torrefies the nut waste component. In one embodiment, the nut waste component is dried. In another embodiment, the nut waste component's pH is adjusted to a pH of 5.0 to 8.0 then dried.

In general, the nut waste component has a residual moisture content of less than 0.5 wt. % water. In various embodiments, the nut waste component has a residual moisture content of less than 0.5 wt. % water, less than 0.4 wt. % water, less than 0.3 wt. % water, less than 0.2 wt. % water, or less than 0.1 wt. % water. In one embodiment, the nut waste component has a residual water content of less than 0.1 wt. %.

The temperature at which the nut waste component was dried may range from about 80° C. to about 120° C. for a duration of time. In various embodiments, the temperature at which the nut waste component was dried may be about 80° C., about 85° C., about 90° C., about 95° C., about 100° C., about 105° C., about 110° C., about 115° C., or about 120° C. In various embodiments, the temperature at which the nut waste component was dried may range from about 80° C. to about 85° C., from about 85° C. to about 90° C., from about 90° C. to about 95° C., from about 95° C. to about 100° C., from about 100° C. to about 105° C., from about 105° C. to about 110° C., from about 110° C. to about 115° C., or from about 115° C. to about 120° C. This drying process may utilize an inert atmosphere, reduced pressure (vacuum), agitation, a dried air flow, a high pressurized air flow, or a combination thereof.

In general, the nut waste component has an adjusted pH ranging from 5.5 to 8.0 before introduction into the composite. In various embodiments, the pH of the nut waste hulls, the nut waste shells, or a combination of the nut waste hulls and nut waste shells ranges from 5. to 5.5, from 5.5 to 6.0, from 6.0 to 6.5, from 6.5 to 7.0, from 7.0 to 7.5, or from 7.5 to 8.0.

The nut waste component has a specific size before introduction into the composite. Generally, the nut waste component may be ground using commercial grinding equipment to achieve the desired size. In one embodiment, the size of the nut waste component may be less than 250 µm. In another embodiment, the size of the nut waste component may be less than 500 µm and greater than 250 µm. These sizes of the nut waste component would provide composites that can be readily formed into various shapes, allows for increased strength of the composites, and allows the composites to be flexible.

In general, the weight percentage (wt. %) of the nut waste component may range from about 35.0 wt. % to about 75.0 wt. %. In various embodiments, the wt. % of the nut waste component may range from about 35.0 wt. % to about 75.0 wt. %, from about 35 wt. % to about 40 wt. %, from about 40 wt. % to about 45 wt. %, from about 45 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, or from about 70 wt. % to about 75 wt. %.

(b) Binders in the Composite

The nut waste composite comprises one or more binders. Non-limiting examples of suitable one or more binders may be selected from a group consisting of polyhydroxybutyrate (PHB), polyhydroxyalkanoate (PHA), polycaprolactone (PCL), polylactic acid (PLA), guayule, natural latex, bentonite, an anionic starch, hyaluronic acid, triethylcitrate, water, and any combinations thereof. In one embodiment, the one or more binders may be polyhydroxybutyrate (PHB). In another embodiment, the binder may be water. The water may be distilled water, deionized water, or potable (tap) water.

Generally, the weight % (wt. %) of one or more binders in the nut waste composite may range from 25.0 wt. % to about 40.0 wt. %. In various embodiments, the wt. % of the one or more binders may range from about from 25.0 wt. % to about 40.0 wt. %, from about 25 wt. % to about 30 wt. %, from about 30 wt. % to about 35 wt. %, or from about 35 wt. % to about 40 wt. %.

(c) One or More Fillers in the Composite

The nut waste composite may further comprise one or more fillers. The one or more fillers, as detailed herein, improves the mechanical properties in the composite. With the inclusion of the one or more fillers, the mechanical property of the nut waste composite can and will vary depending on the particular filler used in the composite, the combination of two or more fillers used in the composite, the nut waste component used, the size of the nut waste component used, and the oil used. In one embodiment, the mechanical property improvement comprises an increase in impact strength of the nut waste composite.

A variety of one or more fillers may be used in the nut waste composite. Non-limiting examples of suitable one or more fillers are selected from a group consisting of hemp hurd, cork, and a combination thereof.

Generally, the wt. % of the filler in the nut waste composite may range from about 0.0 wt. % to about 25.0 wt. %. In various embodiments, the wt. % of the filler in the nut waste composite may range from about 0.0 wt. % to about 25.0 wt. %, from about 0 wt. % to about 5 wt. %, from about 5 wt. % to about 10 wt. %, from about 7.5 wt. % to about 12.5 wt. %, from about 10 wt. % to about 15 wt. %, from about 15 wt. % to about 20 wt. %, or from about 20.0 wt. % to about 25.0 wt. %.

(d) An Oil in the Composite

The nut waste pot composite may further comprise an oil. The oil, as detailed herein, may improves the composite's ductility, and facilitates releasing the composite from a mold. The oil also provides for acceptable pressure ranges during extruding, molding, or thermoforming allowing for the composite to be formed in various shapes and sizes.

A variety of oils may be used in the nut waste composite. Non-limiting examples of suitable oils comprise castor oil, coconut oil, corn oil, cottonseed oil, palm oil, rapeseed oil, safflower oil, soybean oil, linseed oil, triethylcitrate, or tung oil. In an embodiment, the oil useful in the nut waste composite comprises castor oil.

In general, the oil in the nut waste composite may range from 0 wt. % to about 20 wt. %. In various embodiments, the oil in the nut waste composite may range from about 0 wt. % to about 5 wt. %, from about 5 wt. % to about 10 wt. %, from about 7.5 wt. % to about 12.5 wt. %, from about 10 wt. % to about 15 wt. %, or from about 15 wt. % to about 20 wt. %.

(d) Optionally Comprising at Least One Fungus, at Least One Bacterium, or at Least One Fungus and at Least One Bacterium The nut waste composite may optionally have an additional at least one fungus, at least one bacterium, or a combination of at least one fungus and at least one bacterium introduced into it. The nut waste composite naturally comprises at least one fungus, at least one bacterium, or a combination of at least one fungus and at least one bacterium. The inclusion of at least one fungus, at least one bacterium, or a combination of at least one fungus and at least one bacterium enhances the biodegradability and biocompostability of the composite and the product that is prepared from the composite. Non-limiting examples of suitable fungus and bacterium may be *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

The inclusion of the additional at least one fungus, at least one bacterium, or a combination of at least one fungus and at least one bacterium may occur after the composite is compounded, extruded, molded, thermoformed; and cooled into the final form.

(e) Properties of the Nut Waste Composite

The cured nut waste composites exhibit some beneficial and unique properties. Some of these properties may be increased strength, enhanced biodegradability, biocompostable, ease of production of the nut waste composite, and low cost.

In general, the cured nut waste composites may exhibit an elastic modulus from about 0.9 GPa (gigs pascals, 900 N/mm$^2$) to about 2.8 GPa (2800 N/mm$^2$). In various embodiments, the cured nut waste composites may exhibit an elastic modulus from about 0.9 GPa to about 2.8 GPa, from about 0.9 GPa to about 1.2 GPa, from about 1.2 GPa to about 1.5 GPa, from about 1.5 GPa to about 1.8 GPa, from about 1.8 GPa to about 2.0 GPa, or from about 2.0 GPa to about 2.8 GPa. In one embodiment, the cured nut waste composites exhibit an elastic modulus from about 0.9 GPa to about 1.2 GPa. In another embodiment, the cured nut waste composites may exhibit an elastic modulus ranging from about 20 GPa to about 28 GPa. These elastic modulus values indicate that the cured nut waste composites are rigid.

Generally, the cured nut waste composites after compounding; heating; and extruding, molding, or thermoforming may exhibit an elastic modulus from about 0.8 GPa to about 1.2 GPa. In various embodiments, the cured nut waste composites after compounding; heating; and extruding, molding, or thermoforming may exhibit an elastic modulus from about 0.8 GPa to about 1.2 GPa, from about 0.8 Ga to about 0.9 GPa, from about 0.9 GPa to about 1.0 GPa, from about 1.0 GPa to about 1.1 GPa, or about 1.1 GPa to about 1.2 GPa.

In general, the cured nut waste composites may exhibit a break stress (mega pascals, MPa, N/mm$^2$) from about 3.0 MPa to about 40 MPa. In various embodiments, the cured nut waste composites may exhibit a break stress from about 3.0 MPa to about 40 MPa, from about 3.0 MPa to about 10 MPa, from about 10 mPa to about 20 MPa, from about 20 MPa to about 30 MPa, or from about 30 MPa to about 40 MPa. In one embodiment, the cured nut waste composites may exhibit a break stress from about 10 mPa to about 20 MPa.

Generally, the cured nut waste composites after compounding; heating; and extruding, molding, or thermoforming may exhibit a Strain at Break from about 0.7% to about 1.0%. In various embodiments, the cured nut waste composites after compounding; heating; and extruding, molding, or thermoforming may exhibit a Strain at Break from about 0.7% to about 1.0%, from about 0.7% to about 0.8%, from about 0.8% to about 0.9%, or from about 0.9% to about 1.0%.

In general, the cured nut waste composites may exhibit a Flexural Strength from about 0.5 mPa to about 20.0 MPa. In various embodiments, the cured nut waste composites may exhibit a Flexural Strength from about 0.5 mPa to about 5.0 MPa, from about 5.0 MPa to about 10.0 MPa, from about 10.0 MPa to about 15.0 MPa, or from about 15.0 MPa to about 20.0 MPa. In one embodiment, the cured nut waste composites may exhibit a Flexural Strength from about 0.5 mPa to about 7.0 MPa. In another embodiment, the cured nut waste composites may exhibit a Flexural Strength from about 10.0 mPa to about 20.0 MPa.

Generally, the cured nut waste composites may exhibit a Maximum Strain Percentage (%) from about 0.5% to about 7%. In various embodiments, the cured nut waste composites may exhibit a Maximum Strain Percentage from about 0.5% to about 5%, from about 1% to about 2%, from about 2% to about 3%, from about 3% to about 4%, from about 4% to about 5%, from about 5% to about 6%, or from about 6% to about 7%. In one embodiment, the cured nut waste composites may exhibit a maximum Strain Percentage from about 1.0% to about 5%.

In general, the cured nut waste composites may exhibit a Toughness ($J/m^3$) from about 0.006 to about 0.7. In various embodiments, the cured nut waste composites may exhibit a Toughness ($J/m^3$) from about 0.006 to about 0.7, from about 0.006 to about 0.01, from about 0.01 to about 0.05, from about 0.05 to about 0.1, from about 0.1 to about 0.2, from about 0.2 to about 0.3, from about 0.3 to about 0.4, from about 0.4 to about 0.5, from about 0.5 to about 0.6, from about 0.6 to about 0.7. In one embodiment, the cured nut waste composites may exhibit a Toughness ($J/m^3$) from about 0.006 to about 0.7. In another embodiment, the cured nut waste composites may exhibit a Toughness ($J/m^3$) from about 0.2 to about 0.7.

Generally, the cured nut waste composites after compounding; heating; and extruding, molding, or thermoforming may exhibit an Ultimate Tensile Strength from about 4.40 MPa to about 5.4 MPa. In various embodiments, the cured nut waste composites after compounding; heating; and extruding, molding, or thermoforming may exhibit an Ultimate Tensile Strength from about 4.40 MPa to about 5.4 MPa, from about 4.40 MPa to about 4.6 MPa, from about 4.6 MPa to about 4.8 MPa, from about 4.8 MPa to about 5.0 MPa, from about 5.0 MPa to about 5.2 MPa, or from about 5.2 MPa to about 5.4 MPa.

In general, the cured nut waste composite after compounding; heating; and extruding, molding, or thermoforming may exhibit an impact strength from about 0.45 ft-lb/in to about 0.55 ft-lb/in. In various embodiments, the cured nut waste composite after compounding; heating; and extruding, molding, or thermoforming may exhibit an impact strength from about 0.45 ft-lb/in to about 0.55 ft-lb/in, from about 0.45 ft-lb/in to about 0.47 ft-lb/in, from about 0.47 ft-lb/in to about 0.49 ft-lb/in, from about 0.49 ft-lb/in to about 0.51 ft-lb/in, from about 0.51 ft-lb/in to about 0.53 ft-lb/in, or from about 0.53 ft-lb/in to about 0.55 ft-lb/in.

With the inclusion of the nut waste component, the properties of the nut waste composites change. Including more nut hull waste components, the nut waste composites are generally more rigid. Including more nut shell waste components, the nut waste composites are generally softer. During the preparation of the nut waste composites, the nut waste component increases the plasticity of the nut waste composites, decreases the viscosity and friction as measured by a reduced amount of torque necessity for compounding.

With the inclusion of one or more fillers in the nut waste composite, an improvement in the mechanical properties is realized, namely the impact strength.

The nut waste composites produced may be formed or casted into a number of cured forms. These formed or casted forms may be further melted and reformed or recast into alternate final forms. Some non-limiting examples of suitable forms or shapes are not limited to viscous liquid resins, solid resins, pellets, flakes, disks, wafers, or ribbons. Some final forms may be a pot, a tray, or a panel such as two-piece panel system, a rigid modular roofing or landscaping tray, and a structurally horticultural pot.

(e) Exemplary Embodiments

In one embodiment, the cured nut waste composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 μm or less than 500 μm and greater than 250 μm; (e) compounding the nut waste component from step (d), one or more binders selected from a group consisting of polyhydroxybutyrate (PHB), polyhydroxyalkanoate (PHA), polylactic acid (PLA), polycaprolactone (PCL), guayule, natural latex, bentonite, an anionic starch, hyaluronic acid, triethylcitrate, and any combinations thereof; one or more fillers; and an oil producing a compounded mixture; (e) heating the compounded mixture to a temperature from about 110° C. to about 200° C. for less than about 5 minutes; (g) extruding, molding, or thermoforming the heated mixture from step (f) into a form; and (h) cooling the form to form the cured nut waste pot composite wherein the mixture in step (e) consists of about 35.0 weight % (wt. %) to about 75.0 wt. % of the nut waste component, about 25.0 wt. % to 40.0 wt. % of one or more binders, about 0.0 wt. % to about 25.0 wt. % of one or more fillers; 0.0 and 0.0 to 20.0 wt. % of an oil.

(II) Methods for Preparing the Nut Waste Composite

The present disclosure also encompasses methods for preparing the cured nut waste composite using a compounder/extruder. The methods comprising: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 μm or less than 500 μm and greater than 250 μm; (e) compounding the nut waste component from step (d), one or more binders selected from a group consisting of polyhydroxybutyrate (PHB), polyhydroxyalkanoate (PHA), polylactic acid (PLA), guayule, natural latex, bentonite, an anionic starch, hyaluronic acid, triethylcitrate, and any combinations thereof, one or more fillers, and an oil producing a compounded mixture; (e) heating the compounded mixture to a temperature from about 110° C. to about 200° C. for less than about 5 minutes; (g) extruding, molding, or thermoforming the heated mixture from step (f) into a form; and (h) cooling the form to form the cured nut waste composite.

(a) Providing a Nut Waste Component

The method commences by providing a nut waste component. In one embodiment, the nut waste component is obtained from a nut processing facility. In some instances, twigs from the nut tree are removed. Thus, the nut waste component may include nut waste shells, nut waste hulls, or a combination of water nut hulls and nut shells.

(b) Drying the Nut Waste Component or Adjusting the pH of the Nut Waste Component then Drying, Sterilizing, or Torrefying the Nut Waste Component The next step in the method consists of drying the nut waste component or adjusting the pH of the nut waste component then drying, sterilizing, or torrefying the nut waste component.

The nut waste component is dried to reduce the amount of residual water to less than 0.5 wt. %. In various embodiments, the nut waste component has a residual moisture content of less than 0.5 wt. % water, less than 0.4 wt. % water, less than 0.3 wt. % water, less than 0.2 wt. % water, or less than 0.1 wt. % water. In one embodiment, the nut waste component has a residual water content of less than 0.1 wt. %.

The temperature for drying the nut waste component may range from about 80° C. to about 120° C. for a duration of time. In various embodiments, the temperature at which the nut waste component was dried may be about 80° C., about 85° C., about 90° C., about 95° C., about 100° C., about 105° C., about 110° C., about 115° C., or about 120° C. In various embodiments, the temperature at which the nut waste component was dried may range from about 80° C. to about 85° C., from about 85° C. to about 90° C., from about 90° C. to about 95° C., from about 95° C. to about 100° C., from about 100° C. to about 105° C., from about 105° C. to about 110° C., from about 110° C. to about 115° C., or from about 115° C. to about 120° C. This drying process may utilize an inert atmosphere, reduced pressure (vacuum), agitation, a dried air flow, a high pressurized air flow, or a combination thereof.

The duration of drying depends on the residual water content, the type of nut waste component, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours. In one embodiment, the duration of drying may range from about 2 hours to about 6 hours.

For adjusting the pH, the nut waste component including nut waste hulls, nut waste shells, or a combination of nut waste hulls and nut shells may be contacted with an aqueous solution of a proton acceptor or water and a solid proton acceptor. In various embodiments, the pH of the nut waste hulls, the nut waste shells, or a combination of the nut waste hulls and nut waste shells ranges from 5.0 to 5.5, from 5.5 to 6.0, from 6.0 to 6.5, from 6.5 to 7.0, from 7.0 to 7.5, or from 7.5 to 8.0.

The nut waste component is initially contacted with water forming a slurry. Once the slurry is prepared, a proton acceptor is contacted to the nut waste slurry. The proton acceptor may be a solid, a concentrated aqueous solution, or a dilute aqueous solution. After the addition is complete, the pH of the nut waste component is adjusted using additional proton acceptor. Alternatively, the nut waste component is contacted with an aqueous solution of the proton acceptor. After the addition is complete, the pH of the nut waste component is adjusted using additional proton acceptor. The concentration of the aqueous proton acceptor may range from about 0.1 M to about 10 M.

The amount of water used in the preparation of the slurry may depend on the nut waste component used, the amount of the nut waste component, the ability to adequately stir the slurry, and the specific proton acceptor used to adjust the pH. The water may be deionized, distilled, or potable water.

In general, the amount of water (volume) to the nut waste component (weight) used in the slurry to adjust the pH may range from about 1:1 to about 100:1. In various embodiments, the amount of water (volume) to the amount of nut waste component (weight) used in the slurry may range from about 1:1 to about 100:1, from about 1:1 to about 5:1, from about 5:1 to about 10:1, from about 10:1 to about 15:1, from about 15:1 to about 20:1, from about 20:1 to about 25:1, from about 25:1 to about 30:1, from about 30:1 to about 35:1, from about 35:1 to about 40:1, from about 40:1 to about 45:1, from about 50:1 to about 55:1, from about 55:1 to about 60:1, from about 60:1 to about 65:1, from about 65:1 to about 70:1, from about 70:1 to about 75:1, from about 75:1 to about 80:1, from about 80:1 to about 85:1, from about 85:1 to about 90:1, from about 90:1 to about 95:1, or from about 95:1 to about 100:1. Once the slurry is prepared, the proton acceptor is added to adjust the pH.

Numerous proton acceptors may be used in adjusting the pH of the slurry of the nut waste component and water. Generally, the proton acceptor may be inorganic in nature. Non-limiting examples of suitable inorganic proton acceptors include sodium hydroxide, potassium hydroxide, calcium hydroxide, barium hydroxide, ammonia, cesium carbonate, sodium bicarbonate, potassium bicarbonate, sodium carbonate, potassium carbonate, calcium carbonate, sodium borate, sodium dihydrogen phosphate, disodium hydrogen phosphate, sodium methoxide, sodium tert-butoxide, potassium tert-butoxide, sodium acetate, and potassium acetate. The amount of the proton acceptor used depends on the initial pH of the nut waste component.

The pH of the slurry of the nut waste component and water is adjusted to a range of 5.5 to 8.0. In various embodiments, the pH of the nut waste hulls, the nut waste shells, or a combination of the nut waste hulls and nut waste shells is adjusted to a range of 5.0 to 5.5, from 5.5 to 6.0, from 6.0 to 6.5, from 6.5 to 7.0, from 7.0 to 7.5, or from 7.5 to 8.0 utilizing the proton acceptor. The pH of the slurry is measured through means as disclosed in the arts, such as a pH meter, litmus paper, or an inline pH device.

After completion of the pH adjustment, the pH adjusted nut waste and water is filtered through means known in the art to remove excess water for example but not limited to gravity filtration or centrifugation and may be washed with additional water one or more times. The water used in this washing may be distilled water, deionized water, or potable water.

The pH adjusted material may be then dried. This step removes excess water, removes excess water, and eliminates unwanted fungus and bacterium; or removes excess water and eliminates unwanted fungus and bacterium, and removing volatile organic compounds from the nut waste component.

For drying, the pH adjusted nut waste component is contacted with heat. The drying may further comprise utilizing an inert atmosphere such as helium or nitrogen and may utilize reduced pressure (vacuum).

The temperature for drying the nut waste component may range from about 80° C. to about 120° C. In various embodiments, the temperature of drying may range from about 80° C. to 120° C., from 90° C. to about 110° C., or about 100° C. An inert atmosphere, reduced pressure (vacuum), agitation, a high dried air flow, or a combination thereof may be also utilized in drying the nut waste composite.

The duration of drying depends on the residual water content, the amount of nut waste component that needs to be dried, and the target residual water in the nut waste component. Generally, the target water content in the dried nut waste component is less than 0.5 wt. %. In various embodiments, the nut waste component has a residual moisture content of less than 0.5 wt. % water, less than 0.4% water, less than 0.3% water, less than 0.2% water, or less than 0.1% water. In one embodiment, the nut waste component has a residual water content of less than 0.1 wt. %.

Sterilization removes excess water but also removes, kills, or deactivates all forms of life (in particular referring to microorganisms such as fungi, bacterium, viruses, spores, unicellular eukaryotic organisms such as Plasmodium, etc.) and other biological agents like prions present in the nut waste hull and nut shell. Sterilization may utilize an autoclave, dry heat sterilization, and further utilize a chemical agent such as ethylene oxide, nitrogen dioxide, ozone, and hydrogen peroxide.

The sterilization temperature for drying the nut waste component may range from about 100° C. to about 150° C. In various embodiments, the sterilization temperature for drying may range from about 100° C. to about 150° C., from about 110° C. to about 140° C., or about 125° C. to about 130° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

Torrefaction is a mild form of pyrolysis at temperatures typically between 200° C. and 320° C. that removes excess water, removes, kills, or deactivates all forms of life, and removes volatile organic compounds. Torrefaction changes the properties to reduce the amounts of tars, organic materials, water, and methane within the nut waste component. Torrefaction produces a relatively dry product and generally hydrophobic material, which reduces or eliminates its potential for organic decomposition.

The torrefaction temperature for drying the nut waste component using may range from about 200° C. to about 320° C. In various embodiments, the torrefaction temperature for drying may range from about 200° C. to about 320° C., from about 220° C. to about 300° C., or about 250° C. to about 275° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

(c) Cooling the Dried or pH Adjusted then Dried, Sterilized, or Torrefied Nut Waste Composite to Room Temperature The next step in the method, step (c), comprises cooling the dried or pH adjusted then dried, sterilized, or torrefied nut waste composite to room temperature. The cooled nut waste component allows for a well dispersed heterogeneous mixture with one or more binders.

(d) Grinding the Size of the pH Adjusted Nut Waste Component

The next step in the method, step (d), comprises adjusting the size of the pH adjusted nut waste component from step (c). This method step consists of grinding, milling, and/or crushing the dried nut waster component from step (c) to achieve a specific size of the nut waste component. A solid mesh sieve is additionally used to ensure the nut waste component is in the appropriate size range. The size of the nut waste component after grinding, milling, or crushing may be less than 250 μm or less than 500 μm and greater than 250 μm. In one embodiment, the size of the nut waste component after grinding, milling, or crushing may be less than 250 μm. In another embodiment, the size of the nut waste component after grinding, milling, or crushing may be less than 500 μm and greater than 250 μm. This size of the nut waste component is useful in producing a nut waste pot composite.

(e) Compounding the Nut Waste Component from Step (d), One or More Binders Selected from a Group Consisting of polyhydroxybutyrate (PHB), polyhydroxyalkanoate (PHA), polycaprolactone (PCL), polylactic Acid (PLA), Guayule, Natural Latex, Bentonite, an Anionic Starch, Hyaluronic Acid, Triethylcitrate, and Any Combinations Thereof; One or More Fillers, and an Oil Producing a Compounded Mixture The next step, step (e), comprises compounding the nut waste component from step (d), one or more binders selected from a group consisting of polyhydroxybutyrate (PHB), polyhydroxyalkanoate (PHA), polylactic acid (PLA), plycaprolactone (PCL), guayule, natural latex, bentonite, an anionic starch, hyaluronic acid, triethylcitrate, and any combinations thereof, one or more fillers, and an oil producing a compounded mixture.

The one or more binders, before entering the compounder, generally may have a moisture content of 0.25% since the binders are obtained commercially in a dried state. If the nut waste component comprising nut waste hulls, nut waste shells, or a combination of nut waste hulls and nut waste hulls, the one or more binders, and the oil are not previously dried before entering the compounder, the residual moisture may be about 7% or greater. The temperature for drying these components may range from about 50° C. to about 100° C. In various embodiments, the temperature of drying the one or more binders may range from about 50° C. to 100° C., from 60° C. to about 90° C., or about 70° C. to 80° C. An inert atmosphere, reduced pressure (vacuum), agitation, a high dried air flow, or a combination thereof may be also utilized in drying these components.

The addition of these components in the nut waste composite may occur in any sequential order, in portions, or all at the same time. During this compounding step, the mixture of the nut waste component and at least one or more binders is compounded using methods known in the art.

(f) Heating the Mixture from Step (e)

The next step in the method comprises heating the components from step (e). This step in the method prepares a malleable pre-composite where the hydroxyl functionality of the cellulose, hem icellulose, and lignin may react with one or more binders to form an extended polymer network. By maintaining the malleable pre-composite at an elevated temperature and the inclusion of the oil, the malleable pre-composite may be extruded, injection molded, compression molded, air injected, molded, pressed, thermoformed, or other means known in the art to form numerous shapes or numerous forms. As described above, step (e) and step (f) may occur in a single continuous process.

The temperature of heating the components from step (e) may range from about 110° C. to about 200° C. In various embodiments, the temperature of drying may range from about 110° C. to about 200° C., from about 110° C. to about 120° C., from about 120° C. to about 130° C., from about 130° C. to about 140° C., from about 140° C. to about 150° C., from about 150° C. to about 160° C., from about 160° C. to about 170° C., from about 170° C. to about 180° C., from about 180° C. to about 190° C., or from about 190° C. to about 200° C.

In general, the duration of heating the mixture from step (e) may range from about 30 seconds to about 1 hour. In various embodiments, the duration of heating the mixture from step (e) may range from about 30 seconds to about 1 hour, from about 1 minute to about 45 minutes, or from about 15 minutes to about 30 minutes. In one embodiment, the duration of heating the mixture from step (e) is about 15 minutes.

With the incorporation of the nut waste component into the composite, the nut waste composite acts a plasticizer. The oil provides reduced flow pressures for the formation of the desired form. The nut waste composite is softer and more flexible as compared to plastic materials yet provided durability and rigidness. During the preparation of the nut waste composite, the nut waste component increases the plasticity of the composite, decreases the viscosity and friction as measured by a reduced amount of torque necessity for compounding, extruding, molding, or thermoforming. This property allows for the preparation of a variety of forms, shapes, and articles in various shapes and sizes.

(g) Extruding, Molding, or Thermoforming the Heated Mixture from Step (f) into a Form The next step in the process, step (g), comprises extruding, molding, or thermoforming the heated mixture from step (f) into a form. The form from the extruding, molding, or thermoforming process may of various dimensions, various shapes, and various thicknesses.

Steps (e) through (g), may be also performed in a continuous manner. Thus, the nut waste component may be contacted with at least one binder and optional oil; heating the mixture of the nut waste component and at least one binder; extrusion, molding, or thermoforming, and then extrudes, molds, or thermoforms the composite into various shapes such as pellets, granules, and flakes for example.

(h) Cooling the Form to Form the Cured Nut Waste Composite

The final step in the method, step (h), is to allow the form from step (g) to initially cool to about 100° C. to about 130° C. At this temperature range, the malleable pre-composite can be readily formed into various shapes. Some non-limiting examples of suitable forms or shapes of the malleable pre-composite may be but not limited to viscous liquid resins, solid resins, pellets, flakes, disks, wafers, or ribbons. The malleable pre-composite may be extruded, air injected, compressed, and molded into numerous final shapes, or forms. Some non-limiting examples of these shapes and forms may be a pot, a sheet, or a panel. Once these shapes are formed and cooled to room temperature, a durable form in prepared. In some embodiments, the viscous liquid resins, solid resins, pellets, flakes, disks, wafers, or ribbons may be heated again to form a malleable pre-composite and then extruded, molded, compressed, or thermoformed. In this embodiment, these the viscous liquid resins, solid resins, pellets, flakes, disks, wafers, or ribbons can be prepared at a manufacturing facility, transported to a molding facility to form the final formed composites.

(i) Optionally Contacting the Composite with at Least One Fungus, at Least One Bacterium, or a Combination of at Least One Fungus and One Bacterium When the nut waste component is dried or pH adjusted and then dried, the at least one fungus, at least one bacterium, or a combination of at least one fungus and one bacterium will be present in the nut waste component. When the nut waste composite is either sterilized or torrefied or pH adjusted and then sterilized or torrefied, the nut waste component does not contain at least one fungus, at least one bacterium, or a combination of at least one fungus and one bacterium. In either case, the at least one fungus, at least one bacterium, or a combination of at least one fungus and one bacterium may be optionally added after the malleable pre-composite or the final composite. The cured nut waste composite would naturally biodegrade especially in contact with water and is biocompostable. A list of suitable fungi and bacteria are detailed above in Section (I). The at least one fungus, at least one bacterium, or a combination of at least one fungus and one bacterium may be introduced using numerous methods known in the art. Non-limiting methods may be spraying an aqueous solution of at least one fungus, at least one bacterium, or a combination of at least one fungus and one bacterium or may be painting an aqueous solution of at least one fungus, at least one bacterium, or a combination of at least one fungus and one bacterium onto the composite or inoculating the composite.

(III) Methods of Using the Nut Waste Composite

The present disclosure also encompasses methods of using the cured nut waste composite. The malleable pre-composite may be casted, extrusion molded, injection molded, matrix molded, compression molded, and thermoformed into the final cured nut waste. Some non-limiting examples of malleable pre-composite are not limited to viscous resins, solid resins, pellets, flakes, disks, wafers, ribbons, pots, sheets, and panels.

Some of these forms or shapes of the nut waste composites may be further made malleable using heat and transformed into a variety of final end products. Some non-limiting examples of suitable final end products produced from the cured nut composite may be carpet underlayment, flooring, insulation, shipping containers for variety of products such as wine, biotechnology, genetic engineering, organ procurement, diagnostic testing to pharmaceutical distribution, modular roofing and landscaping trays currently used in the building and landscape construction industry, biodegradable flower pots, seed pots, lids for cups, as well as many others. These forms or shapes of the suitable end products have an improvement in the impact strength using the filler.

FIG. 1, FIG. 2, FIG. 3, and FIG. 4 shows examples of various pot produced using the nut waste composite.

Figure 5:
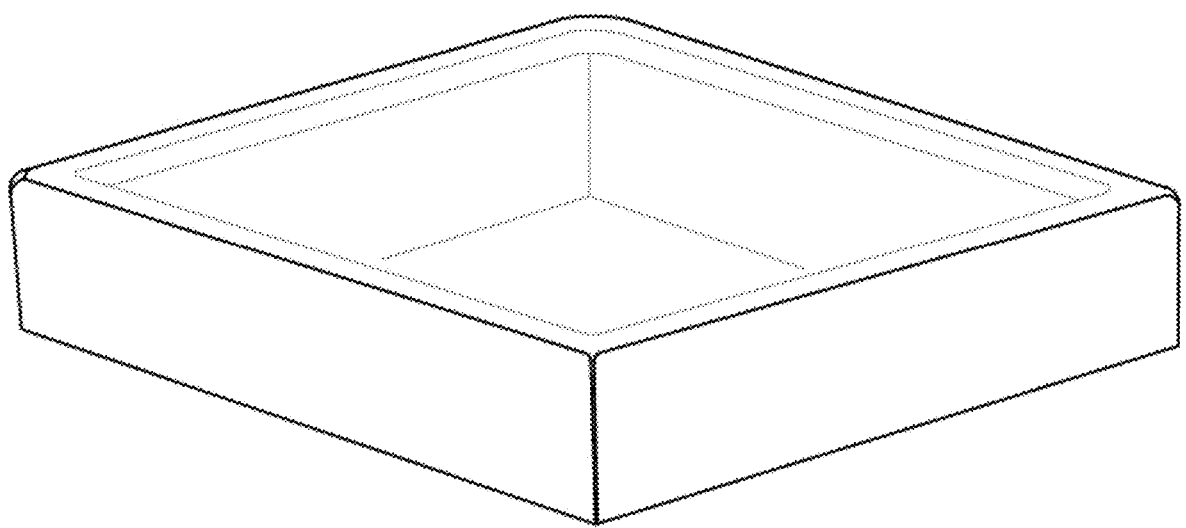
FIG. 5 is a graphical representation of a tray produced from the nut waste composite.
Figure 6:
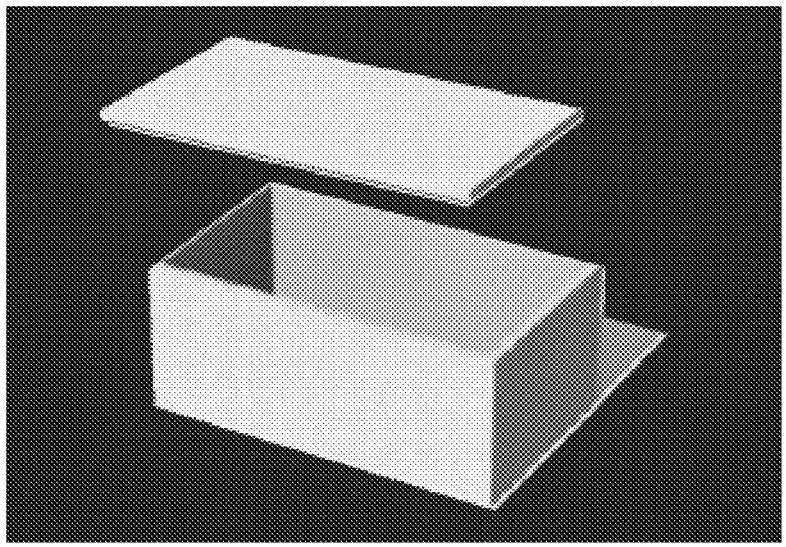
FIG. 6 shows shipping container produced using the nut waste composite.

FIG. 5 shows a tray produced from the nut waste composite. FIG. 6 shows shipping container produced using the nut waste composite.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Further-more, such an interpretation should apply regardless of the breadth of the range, or the characteristics being described.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL."

As various changes could be made in the above-described methods without departing from the scope of the invention, it is intended that all matter contained in the above description and in the examples given below, shall be interpreted as illustrative and not in a limiting sense.

EXAMPLES

Example 1

Into a compounder was placed 40 g of nut waste component in various sizes and amounts which were dried. Into the compounder was added the appropriate amount of an equal mixture of polylactic acid and polyhydroxybutyrate. The mixture was stirred mechanically for 30 minutes at room temperature then heated to 165° C.-200° C. for 10 minutes. These mixtures were cast into various disks to evaluate their mechanical properties. These mixtures were compared to a mixture of PLA and PHB (Bioplast 2202) without the nut waste component. Table 1, shown below, shows the results of these tests.

TABLE 1

| Composition | Elastic Modulus (N/mm2) | Max Stress (N/mm2) | Break Stress (N/mm2) | Max Displacement Strain % | Toughness J |
|---|---|---|---|---|---|
| 100% Bioplast 2202 | 2485 | 42.67 | 30.83 | 13.5 | 1.5905 |
| 5 Wt. % <250 um Shell | 2109 | 41.97 | 40.43 | 3.32 | 0.3204 |
| 10 Wt. % <250 um Shell | 2278 | 30.57 | 30.09 | 1.84 | 0.1195 |
| 15 Wt. % <250 um Shell | 2202 | 17.08 | 17.08 | 1.32 | 0.0748 |
| 20 Wt. % <250 um Shell | 2822 | 22.88 | 22.3 | 4.09 | 0.2361 |
| 4.9 Wt. % <500 um & >250 um Shell | 2575 | 42.8 | 40.27 | 6.97 | 0.6958 |
| 9.9 Wt. % <500 um & >250 um Shell | 2696 | 38.3 | 37.88 | 4.32 | 0.4003 |
| 14.3 Wt. % <500 um & >250 um Shell | 2521 | 30.87 | 30.15 | 2.82 | 0.1871 |
| 20 Wt. % <500 um & >250 um Shell | 2562 | 26.46 | 26.46 | 2.12 | 0.1237 |
| 5 Wt. % <250 um Hull | 2565 | 24.99 | 24.96 | 1.61 | 0.0969 |
| 10 Wt. % <250 um Hull | 2021 | 3.44 | 3.29 | 0.27 | 0.0062 |
| 15 Wt. % <250 um Hull | 2016 | 12.08 | 10.44 | 3.06 | 0.093 |
| 20 Wt. % <250 um Hull | 2101 | 7.49 | NA | 6.76 | 0.0948 |

As can be seen in the above Table 1, the nut waste composites exhibit similar elastic modulus as compared to Bioplast 2202, provide similar break stress, and show lower max displacement strain, toughness, and max stress.

Example 2

Into a round bottom flask was placed 40 g of <250 μm dried nut shells. Into the flask was added 40 g of potable water. This mixture was stirred for 10 minutes until a homogeneous mixture was obtained. The mixture was placed in a Carver press at 150° C. and maximum pressure for 15 minutes. Upon exiting the Carver press, a mold was prepared. Weight 39.8 g.

Example 3

Into a round bottom flask was placed 70 g of <250 μm dried almond nut hulls and 30 g of polyhydroxybutyrate. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a tile shape. The mold was removed from the press and cooled to about 120° C. The tile was cooled to room temperature. The following properties of the tile shaped nut composite was obtained as shown in Table 2:

TABLE 2

| 70/30: Almond Hull/PHB | |
|---|---|
| Elastic Modulus (GPa) | 1.02-1.19 |
| Maximum Strain (%) | 1.26-1.38 |
| Break Stress (MPa) | 13.41-15.20 |
| Flexural Strength (MPa) | 13.41-15.20 |
| Toughness (J/m$^3$) | .041-.042 |

Example 4

Into a round bottom flask was placed 63 g of <250 μm dried almond nut hulls. Into the flask was added 27 g of polyhydroxybutyrate and 10 g of castor oil. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a pot shape. The mold was removed from the press and cooled to about 120° C. The pot was cooled to room temperature. The Melt Flow Index (g/10 min) found ranging from 0.03-0.961.

Example 5

Into a round bottom flask was placed 60 g of <250 μm dried almond nut hulls and 40 g of polyhydroxybutyrate. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a tile shape. The mold was removed from the press and cooled to about 120° C. The tile was cooled to room temperature. The following properties of the tile shaped nut composite was obtained as shown in Table 3:

TABLE 3

| 60/40: Almond Hull/PHB | |
| --- | --- |
| Elastic Modulus (GPa) | 0.90-1.08 |
| Maximum Strain (%) | 1.20-1.5 |
| Break Stress (MPa) | 12.57-13.56 |
| Flexural Strength (MPa) | 12.57-13.56 |
| Toughness (J/m$^3$) | .044-.058 |

Example 6

Into a round bottom flask was placed 54 g of <250 μm dried almond nut hulls. Into the flask was placed 36 g of polyhydroxybutyrate and 10 g of castor oil. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a pot shape. The mold was removed from the press and cooled to about 120° C. The pot was then cooled to room temperature. The Melt Flow Index (g/10 min) found ranging from 1.3 to 4.4.

Example 7: Comparison of Nut Waste Composite Properties with Polypropylene and Polyhydroxybutyrate Table 4, shown below, provides a comparison of properties of the nut waste composite using polyhydroxybutyrate versus polypropylene and polyhydroxybutyrate alone.

TABLE 5

| Properties of Pot Composites Obtained from Compounder/Extruder | |
| --- | --- |
| | 70/30: Hull/PHB |
| Elastic Modulus (GPa) | 0.98 ± 0.15 |
| Strain at Break (%) | 0.91 ± 0.15% |
| Ultimate Tensile Strength (MPa) | 4.92 ± 0.46 |
| Toughness (J/m$^3$) | 0.019 ± 0.006 |

Example 9: Preparation of Nut Waste Composite with Hemp Hurd

Into a round bottom flask was placed 65 g of <250 μm dried almond nut hulls, 10 g of hemp hurd, and 25 g of polyhydroxybutyrate (PHB). The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a pot shape. The mold was removed from the press and cooled to about 120° C.

Example 10: Preparation of Nut Waste Composite with Cork

Into a round bottom flask was placed 55 g of <250 μm dried almond nut hulls, 20 g of cork, and 25 g of polyhydroxybutyrate (PHB). The components were stirred thoroughly to ensure the components were well distributed. Into a warmed hot molding press maintained at 180° C. to 200° C. was placed the mixture of components. The press was activated placing 10 tons of pressure for a period of 10

TABLE 4

| Property Comparison | | | | |
| --- | --- | --- | --- | --- |
| | 70/30: Hull/PHB | 60/40: Hull/PHB | Polypropylene (from literature) | PHB (from literature) |
| Elastic Modulus (GPa) | 1.02-1.19 | 0.90-1.08 | 0.46-3.20 | 1.14-1.19 |
| Maximum Strain (%) | 1.26-1.38 | 1.20-1.5 | 24-150 | 6-9 |
| Break Stress (MPa) | 13.41-15.20 | 12.57-13.56 | 10-15 | 24-27 |
| Flexural Strength (MPa) | 13.41-15.20 | 12.57-13.56 | 15-21 | 35 |
| Toughness (J/m$^3$) | .041-.042 | .044-.058 | .27-.5 | 0.6 |

Example 8: Preparation of Pot Composite from Compounder

Into a compounder/extruder utilizing an 18 mm unvented twin extruder was placed 7 kg of <250 μm dried almond nut hulls, 3 kg of polyhydroxybutyrate (PHB), and 500 g castor oil. The components were mixed thoroughly and heated to 125° C. having a die temperature of 140° C. The compounder/extruder used a feed rate of 1.6 kg/h, a screw speed of 500 rpms, and had an OD/ID of 1.50-1.66. The extruded composite was extruded into a pot form and allowed to cool. The following properties of the pot shaped nut composite was obtained as shown in Table 5:

minutes molding the components into a pot shape. The mold was removed from the press and cooled to about 120° C.

Example 11: Preparation of Nut Waste Composite using Polyhydroxybutyrate and Polycaprolactone Into a round bottom flask was placed 70 g of <250 μm dried almond nut hulls, 24 g of polyhydroxybutyrate, and 6 g of polycaprolactone. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a disk shape. The mold was removed from the press and cooled to about 120°

C. The disk was cooled to room temperature. The impact strength of the nut waste composite including caprolactone increased to 0.50 ft-lb/in from 0.38 ft-lb/in in the nut waste composite not including polycaprolactone.

What is claimed is:

1. A cured almond or pecan nut waste composite prepared by the following steps:
    a) providing an almond or pecan nut waste component selected from the group consisting of almond or pecan nut shells, almond or pecan, nut hulls, and a combination of almond or pecan nut shells and nut hulls;
    b) drying the almond or pecan nut waste component or adjusting the almond or pecan nut waste component to a pH of 5.0 to 8.0 then drying, sterilizing, or torrefying the almond or pecan nut waste component;
    c) cooling the dried or pH adjusted then dried, sterilized, or torrefied the almond or pecan nut waste component to room temperature;
    d) grinding the almond or pecan nut waste component to a size less than 250 μm or less than 500 μm and greater than 250 μm;
    e) compounding the almond or pecan nut waste component from step (d), one or more binders selected from a group consisting of polyhydroxybutyrate (PHB), polyhydroxyalkanoate (PHA), polylactic acid (PLA), polycaprolactone (PCL), guayule, natural latex, bentonite, an anionic starch, hyaluronic acid, triethylcitrate, and any combinations thereof; one or more fillers; and an oil producing a compounded mixture;
    f) heating the compounded mixture to a temperature from about 110° C. to about 200° C. for less than about 5 minutes;
    g) extruding, molding, or thermoforming the compounded mixture from step (f) into a form; and
    h) cooling the form to form the cured nut waste composite;
    wherein the compounded mixture in step (e) consists of about 35.0 weight % (wt. %) to about 75.0 wt. % of the nut waste component, about 25.0 wt. % to 40.0 wt. % of one or more binders, about 0.0 wt. % to about 25.0 wt. % of one or more fillers; and 0.0 and 0.0 to 20.0 wt. % of an oil;
    wherein the cured almond or pecan nut waste composite exhibits an elastic modulus ranging from about 0.8 GPa to about 1.2 GPa and toughness ranging from about 0.006 $J/m^3$ to about 0.7 $J/m^3$.

2. The cured almond or pecan nut waste composite of claim 1, wherein the oil comprises castor oil, coconut oil, corn oil, cottonseed oil, palm oil, rapeseed oil, safflower oil, soybean oil, linseed oil, triethylcitrate, or tung oil.

3. The cured almond or pecan nut waste composite of claim 1, wherein the almond or pecan nut waste component comprises mixtures of cellulose, hemicellulose, and lignin.

4. The cured almond or pecan nut waste composite of claim 1, wherein the temperature of step (g) ranges from 110° C.-175° C.

5. The cured almond or pecan nut waste composite of claim 1, wherein the pH of the nut waste component ranges from about 6.5 to about 7.0.

6. The cured almond or pecan nut waste composite of claim 1, wherein the one or more fillers is selected from hemp hurd, cork, and a combination thereof.

7. The cured almond or pecan nut waste composite of claim 2, wherein the one or more fillers has an opening width of 180 microns or 180 microns to 1700 microns.

* * * * *